July 28, 1953 R. B. EDELMANN 2,646,873
BATTERY SERVICE KIT
Filed Aug. 4, 1951
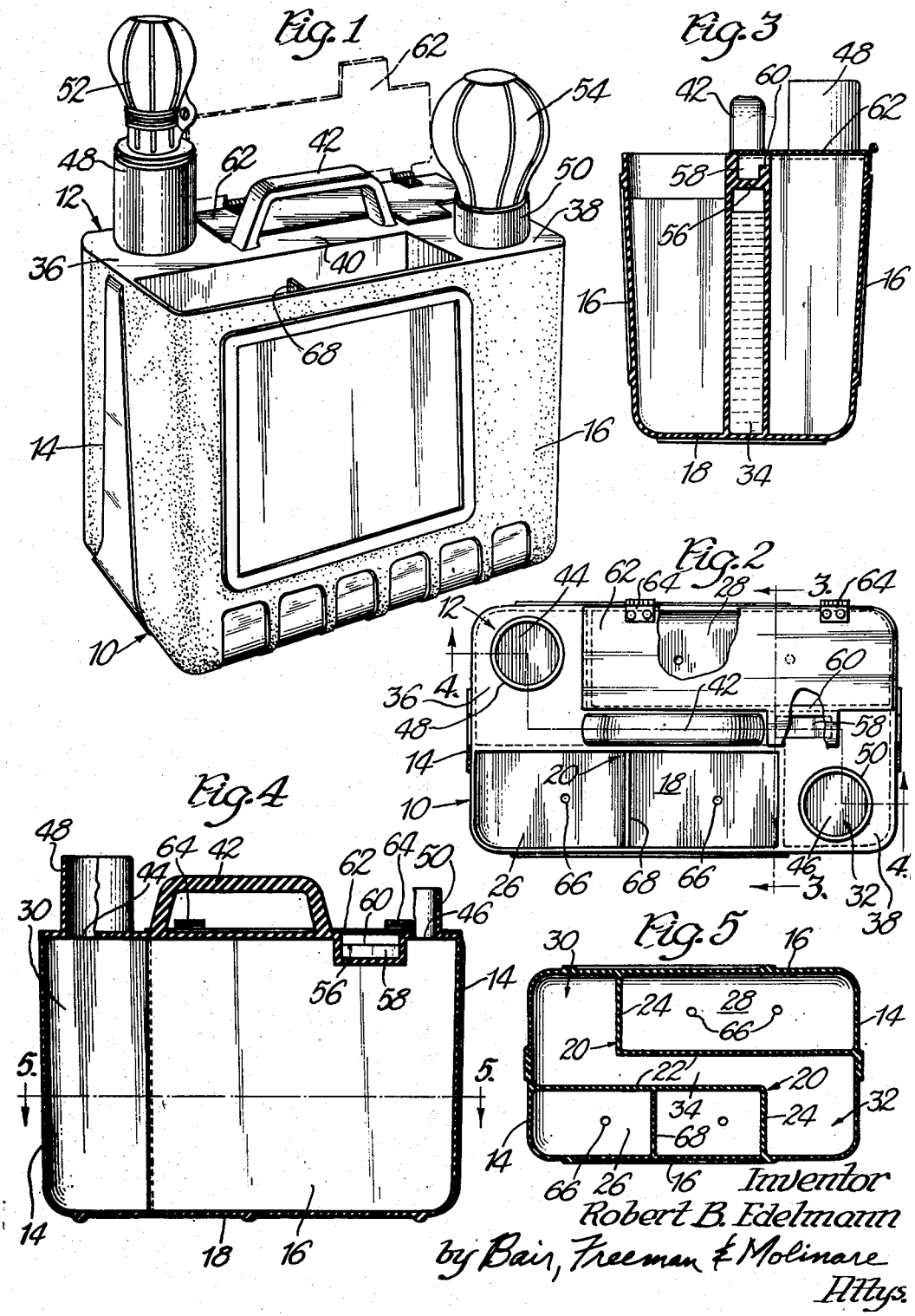
Inventor
Robert B. Edelmann
by Bair, Freeman & Molinare
Attys.

Patented July 28, 1953

2,646,873

UNITED STATES PATENT OFFICE 2,646,873

BATTERY SERVICE KIT

Robert B. Edelmann, Chicago, Ill., assignor to E. Edelmann & Co., Chicago, Ill., a corporation of Illinois Application August 4, 1951, Serial No. 240,407

4 Claims. (Cl. 206—16)

1

This invention relates to a battery service kit and more particularly to an improved battery service kit which provides storage compartments for battery service tools and instruments and compartments for holding water therein, which water is used for refilling batteries.

A battery service kit includes a compartment for water, supports for a battery filling instrument and a hydrometer, and compartments for storage of tools and electrical test instruments normally used in the servicing of automobile batteries.

Heretofore, the water compartment was located centrally of the service kit with the battery filling instrument and hydrometer mounted thereabove, and with storage compartments positioned on opposite sides of the central water compartment. The positioning of the battery filler and hydrometer above the central water compartment interferes with the kit carrying handle which is also positioned centrally of the kit. The proximity of the battery filler and hydrometer to the kit carrying handle often results in rough treatment of these instruments and may lead to breakage of the hydrometer, which is often made of glass and is a relatively expensive instrument. Furthermore, if the weight of the tools in the storage compartments is unequal, the entire kit is unbalanced and the kit is difficult to carry.

Thus, one object of this invention is to provide a battery service kit having water compartments and service tool storage compartments symmetrically arranged and disposed so that the storage compartments are closer to the center of the kit than are the centers of the water compartments, whereby the kit is more balanced and is easier to carry and whereby instruments mounted above the water compartments are spaced from the kit carrying handle, providing better access to the handle.

Another object of this invention is to provide a battery service kit having equal water compartments, whose centers are spaced on opposite sides of the kit carrying handle, which water compartments are interconnected, whereby the water level in the compartments is the same, thus providing for balance of the battery service kit.

Some battery service instruments, such as voltmeters or other electrical test instruments, should be carried in a battery service kit and must be protected from dirt and be kept dry. Some of these test instruments are often provided with hooks or the like, whereby the instrument may be supported from a ridge.

Thus, a further object of this invention is to

2 provide a battery service kit having a test instrument storage compartment which may be covered to protect the instruments therein from dirt and water.

And another object of this invention is to provide a battery service kit having a test instrument storage compartment provided with an adjacent support ridge from which instruments may be hung.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawing, in which—

Figure 1 is an isometric view of the battery service kit showing a battery filling instrument and a hydrometer mounted therein, and showing in broken lines the storage compartment cover swung to a position exposing the storage compartment.

Figure 2 is a top plan view of the battery service kit shown in Figure 1.

Figure 3 is a cross-section view taken on line 3—3 of Figure 2.

Figure 4 is a cross-section view taken on line 4—4 of Figure 2.

Figure 5 is a cross-section view taken on line 5—5, Figure 4.

Referring now to the drawings, there is shown in Figure 1 a battery service kit comprising a rectangular casing generally indicated at 10 and having a top panel generally indicated at 12. The rectangular casing 10 includes a pair of end walls 14, a pair of side walls 16, and a bottom 18.

Positioned internally of the casing 10 are a pair of L-shaped internal walls generally indicated at 20 which extend upright from the bottom 18 of the casing. The long legs 22 of the L-shaped walls 20 terminate at the end walls 14 and the short legs 24 of the L-shaped walls 20 terminate in the side walls 16.

The long legs 22 are longer than one-half the length of the casing and the short legs are shorter than one-half the width of the casing, whereby the long legs 22 of the L-shaped walls 20 are spaced from each other in the region where their lengths overlap.

These L-shaped walls 20 form a pair of rectangular storage compartments 26 and 28 in one pair of diagonally opposite corners of said casing 10 and substantially bound a pair of water compartments 30 and 32 located in the other pair of diagonally opposite corners of said casing. The water compartments 30 and 32 are interconnected by a channel 34 which is bounded by the spaced overlapping lengths of the legs 22 of the L-shaped walls 20.

The top panel 12 is sealingly secured to the upper edges of walls 14, 16, and 20 and includes portions 36 and 38 which respectively overlie water compartments 30 and 32 and a portion 40 which overlies the interconnecting channel 34. A handle 42 is formed integrally with the top panel 12 and is positioned directly above and parallel to the interconnecting channel 34.

The overlying portions 36 and 38 respectively have apertures 44 and 46 formed therein which permit access therethrough for battery service instruments to the water contained in water compartments 30 and 32. A pair of sleeves 48 and 50 respectively extend upwardly from the edges of apertures 44 and 46 and provide supports for battery service instruments, such as the hydrometer 52 and the battery filler 54, shown in Figure 1.

A portion 56 of top panel 12 is so formed as to provide a recess 58 adjacent the storage compartment 28. This recess 58 is positioned on the other side of the leg 22 of L-shaped wall 20, which bounds said storage compartment 28. The portion of the leg 22, of L-shaped wall 20, and the portion of top panel 12 sealed thereto, which are positioned between recess 58 and storage compartment 28, form a ridge 60. An instrument which is stored in compartment 28 and which is provided with a hook to be supported from a ridge may be hooked over ridge 60 and supported therefrom.

A cover 62 is provided to protect the instruments in compartment 28 from dirt and water. The cover 62 is connected by means of hinges 64 to the side wall 16 of casing 10. This cover 62 is so shaped that it completely covers the storage compartment 28 and the adjacent recess 58. The upper edge of ridge 60 is spaced below the plane of the top panel 12, whereby the cover 62 may be closed when a member is hooked over the ridge 60.

Drain holes 66 are also provided in the bottom of the storage compartments 26 and 28 so as to drain off any water that may accumulate therein. As shown in Figure 2, dividing members or walls 68 may be formed in the storage compartments 26 and/or 28, and serve both to divide the compartments into smaller compartments and also to provide reinforcement between the side walls 16 and the long legs 22 of L-shaped walls 20.

The casing 10, including end walls 14, side walls 16, the bottom 18, the two L-shaped walls 22, and the dividing member 68, is formed as a unit of molded rubber. The top panel 12, including the portions 36, 38, and 40, the handle 42, the sleeves 48 and 50, and the portion 56 forming the recess 58, is formed as a second unit, also of molded rubber, and is adapted to be adhesively attached to the casing unit in a fluid sealed joint. This top panel unit is in sealing engagement with the upper edges of the walls which bound the water compartments 30 and 32 and the interconnecting panel 34.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new and desire to secure by Letters Patent of the United States is:

1. A battery service kit comprising a rectangular casing having a bottom and upright sides, a pair of L-shaped internal walls extending upright from said casing bottom, the ends of the legs of said L-shaped walls terminating at the casing walls, the long legs of the L-shaped walls being longer than one-half the length of said casing, the short legs of the L-shaped walls being shorter than one-half the width of said casing, whereby said long legs of the L-shaped walls are spaced from each other in the region where their lengths overlap, said L-shaped walls thus forming a pair of rectangular storage compartments in one pair of diagonally opposite corners of said casing and a pair of water compartments in the other pair of diagonally opposite corners of said casing, said water compartments being interconnected by a channel bounded by the spaced overlapping lengths of the long legs of said L-shaped walls, a top panel overlying said pair of water compartments and said interconnecting channel and being sealingly secured to the upper edges of the casing walls and the L-shaped walls, said top panel having formed therein a pair of apertures each positioned over one of said water compartments and adapted to provide access for battery service instruments to the water therein, a recess formed in said top panel, said recess lying adjacent one of said storage compartments on the other side of an internal wall bounding said storage compartment, and said wall forming a supporting ridge between said compartment and the adjacent recess adapted to have an instrument, which is to be stored in the compartment, hooked thereover and supported therefrom.

2. A battery service kit comprising a rectangular casing having a bottom and upright sides, a pair of L-shaped internal walls extending upright from said casing bottom, the ends of the legs of said L-shaped walls terminating at the casing walls, the long legs of the L-shaped walls being longer than one-half the length of said casing, the short legs of the L-shaped walls being shorter than one-half the width of said casing, whereby said long legs of the L-shaped walls are spaced from each other in the region where their lengths overlap, said L-shaped walls thus forming a pair of rectangular storage compartments in one pair of diagonally opposite corners of said casing and a pair of water compartments in the other pair of diagonally opposite corners of said casing, said water compartments being interconnected by a channel bounded by the spaced overlapping lengths of the long legs of said L-shaped walls, a top panel overlying said pair of water compartments and said interconnecting channel and being sealingly secured to the upper edges of the casing walls and the L-shaped walls, said top panel having formed therein a pair of apertures each positioned over one of said water compartments and adapted to provide access for battery service instruments to the water therein, a recess formed in said top panel, said recess lying adjacent one of said storage compartments on the other side of an internal wall bounding said storage compartment, said wall forming a supporting ridge between said compartment and the adjacent recess adapted to have an instrument, which is to be stored in the compartment, hooked thereover and supported therefrom, and a cover member hingedly secured to the wall of the casing and adapted to completely cover the storage compartment and adjacent recess.

3. A battery service kit comprising a rectangular casing having a bottom and upright sides, a pair of L-shaped internal walls extending upright from said casing bottom, the ends of the legs of said L-shaped walls terminating at the casing walls, the long legs of the L-shaped walls being longer than one-half the length of said casing, the short legs of the L-shaped walls being shorter than one-half the width of said casing, whereby said long legs of the L-shaped walls are spaced from each other in the region where their lengths overlap, said L-shaped walls thus forming a pair of rectangular storage compartments in one pair of diagonally opposite corners of said casing and a pair of water compartments in the other pair of diagonally opposite corners of said casing, said water compartments being interconnected by a channel bounded by the spaced overlapping lengths of the long legs of said L-shaped walls, a top panel overlying said pair of water compartments and said interconnecting channel and being sealingly secured to the upper edges of the casing walls and the L-shaped walls, said top panel having formed therein a pair of apertures each positioned over one of said water compartments and adapted to provide access for battery service instruments to the water therein, a recess formed in said top panel, said recess lying adjacent one of said storage compartments on the other side of an internal wall bounding said storage compartment, said wall forming a supporting ridge between said compartment and the adjacent recess adapted to have an instrument, which is to be stored in the compartment, hooked thereover and supported therefrom, and a cover member hingedly secured to the wall of the casing and adapted to completely cover the storage compartment and adjacent recess, the upper edge of said ridge being spaced below the plane of the top panel, whereby said cover may be closed when a member is hooked over said ridge.

4. A battery service kit comprising a rectangular casing having a bottom and upright sides, a pair of L-shaped internal walls extending upright from said casing bottom, the ends of the legs of said L-shaped walls terminating at the casing walls, the long legs of the L-shaped walls being longer than one-half the length of said casing, the short legs of the L-shaped walls being shorter than one-half the width of said casing, whereby said long legs of the L-shaped walls are spaced from each other in the region where their lengths overlap, said L-shaped walls thus forming a pair of rectangular storage compartments in one pair of diagonally opposite corners of said casing and a pair of water compartments in the other pair of diagonally opposite corners of said casing, said water compartments being interconnected by a channel bounded by the spaced overlapping lengths of the long legs of said L-shaped walls, a top panel overlying said pair of water compartments and said interconnecting channel, said top panel having formed therein a pair of apertures each positioned over one of said water compartments and adapted to provide access for battery service instruments to the water therein, sleeves on said top panel extending upwardly from the edges of said apertures adapted to provide supports for said battery service instruments, and a handle formed in said top panel positioned directly above and parallel to said interconnecting channel, and said casing and L-shaped walls being formed integrally as one unit, and said top panel, handle, and sleeves being formed integrally as a second unit and adhesively attached to said casing unit in a fluid sealed joint along the edges of all walls bounding said water compartments and said interconnecting channel.

ROBERT B. EDELMANN.

References Cited in the file of this patent

UNITED STATES PATENTS

| Number | Name | Date |
|---|---|---|
| D. 115,353 | Thomas | June 20, 1939 |
| 2,024,637 | Geyer | Dec. 17, 1935 |
| 2,205,495 | Schmitt | June 25, 1940 |
| 2,535,493 | Gerber | Dec. 26, 1950 |

FOREIGN PATENTS

| Number | Country | Date |
|---|---|---|
| 428,578 | Great Britain | May 15, 1935 |
| 775,429 | France | Oct. 8, 1934 |